(12) United States Patent
Cabrera et al.

(10) Patent No.: US 6,189,016 B1
(45) Date of Patent: Feb. 13, 2001

(54) JOURNALING ORDERED CHANGES IN A STORAGE VOLUME

(75) Inventors: Luis Felipe Cabrera; Thomas J. Miller, both of Bellevue; Brian D. Andrew, Redmond; Mark J. Zbikowski, Woodinville; Gary D. Kimura, Kirkland, all of WA (US)

(73) Assignee: Microsoft Corporation, Redmond, WA (US)

( * ) Notice: Under 35 U.S.C. 154(b), the term of this patent shall be extended for 0 days.

(21) Appl. No.: 09/097,288

(22) Filed: Jun. 12, 1998

(51) Int. Cl.$^7$ .................................................. G06F 17/30
(52) U.S. Cl. .......................... 707/203; 707/202; 707/201; 707/203; 707/204
(58) Field of Search ................................... 707/200, 201, 707/202, 203, 204

(56) References Cited

U.S. PATENT DOCUMENTS

| | | | |
|---|---|---|---|
| 4,819,156 | * 4/1989 | DeLorme et al. ...................... | 714/15 |
| 4,823,261 | * 4/1989 | Bank et al. . | |
| 5,600,834 | * 2/1997 | Howard ............................... | 707/201 |
| 5,603,024 | * 2/1997 | Goldring ............................. | 707/203 |
| 5,706,509 | * 1/1998 | Tso ....................................... | 707/201 |
| 5,748,985 | * 5/1998 | Kanai .................................. | 711/130 |
| 5,758,355 | * 5/1998 | Buchanan .......................... | 707/201 |
| 5,806,058 | * 9/1998 | Mori et al. ............................ | 707/2 |
| 5,873,096 | * 2/1999 | Lim et al. ............................ | 707/201 |
| 5,907,848 | * 5/1999 | Zaiken et al. ......................... | 707/1 |
| 5,974,425 | * 10/1999 | Obermarck et al. ................. | 707/202 |
| 5,974,429 | * 10/1999 | Strub et al. ......................... | 707/203 |
| 6,026,412 | * 2/2000 | Sockut et al. ...................... | 707/200 |

* cited by examiner

Primary Examiner—Jean R. Homere
(74) Attorney, Agent, or Firm—Schwegman, Lundberg, Woessner & Kluth, P.A.

(57) ABSTRACT

A change journal for recording changes to files in a storage volume of a computer system keeps a record for each notable change to a file. Each record is given a unique update sequence number, which is a serial number of ever-increasing value assigned to each record. Each record includes one or more change reasons specifying what type of action occurred with respect to the associated file. The presence of a close file change reason in a record connotes that the record includes all the notable changes made to the file in a preceding file session, which is defined as the time occurring after the last time a close file change reason was entered in a change record, up to the time of the next succeeding close file change reason. For each file, an entry is made in the storage volume's master file table referencing the change record that currently includes the most up-to-date information on the status of the change reasons for the file.

57 Claims, 6 Drawing Sheets

| | CLIENT A | | CLIENT B | | USN RECORD # | CHANGE REASON HISTORY | SOURCE HISTORY |
|---|---|---|---|---|---|---|---|
| | SOURCE | TRANSACTION | SOURCE | TRANSACTION | | | |
| 100-0 | | | DM | RENAME | n | RENAME | DM |
| 100-1 | 0 | WRITE | DM | READ | n+Δ0 | RENAME/WRITE | 0 |
| 100-2 | 0 | WRITE | DM | WRITE | n+Δ1 | | 0 |
| 100-3 | 0 | SET TIME | DM | TRUNCATE | n+Δ2 | RENAME/WRITE/ TRUNCATE/SET TIME | 0 |
| 100-4 | 0 | CLOSE | | | n+Δ3 | RENAME/WRITE/ TRUNCATE/SET TIME | 0 |
| 100-5 | | | DM | DELETE | n+Δ4 | RENAME/WRITE/ TRUNCATE/SET TIME/ DELETE | 0 |
| 100-6 | | | DM | CLOSE | n+Δ5 | RENAME/WRITE/ TRUNCATE/SET TIME/ DELETE/CLOSE | 0 |

JOURNALING ORDERED CHANGES IN A STORAGE VOLUME

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright®1998, Microsoft Corporation, All Rights Reserved.

TECHNICAL FIELD OF THE INVENTION

This invention relates generally to data storage in digital computers, and more particularly to recording changes to files or file attributes in a storage volume.

BACKGROUND OF THE INVENTION

A self-contained unit of storage in a computer system is often referred to as a "volume." Files systems administer the storage in volumes by allocating it to files and directories in response to appropriate requests. Over time, files and directories are modified in different manners. For example, directories are created and renamed. Files are created and deleted and the data in a file or in one of its attributes can be modified. Files systems reflect these changes to their base entities by modifying appropriate attributes of the entities, like creation date and size.

To track and determine what modifications have happened in a volume, traditional storage management applications have to traverse the name space of the entities in the volume verifying whether attributes of interest (like the size or the last modified date) have changed. This means that, in the absence of any additional mechanism, applications need to roam through the name space of a volume and detect changes by inspecting the appropriate attributes of a file or a directory.

There are several drawbacks to this traditional mechanism. First, when the number of entities in the volume grows, the time to visit them grows. Second the act of traversing the name space affects the contents of the in-memory caches. Given that there is no re-use of the information visited any displacement from the cache of other useful information is detrimental to the over-all performance of the system. Third, the I/O activity required to retrieve the needed attribute information is mostly random. The two main consequences are that, first, the number of disk seeks required to traverse the name space is proportional to the number of entities, thus it takes increasingly longer to do it. Second, this I/O activity has the potential effect of disturbing any other kind of I/O that is happening in the volume.

The Windows® operating system includes a mechanism that tries to address the above problem. This mechanism allows an entity to register for an event that will trigger when a change happens at a directory or at a file. This will, in effect, eliminate the need to traverse the appropriate subset of the name space. The serious drawback of this mechanism is that for each file or directory of interest, an individual event needs to be registered. This does not scale well, as the NT kernel needs to track an ever-increasing number of events to notify on.

Thus, there remains a need for a more efficient, scalable and powerful approach to tracking modifications to a storage volume in a computer system.

SUMMARY OF THE INVENTION

The present invention provides a system for keeping a time-ordered change journal of all the changes that happen in a storage volume. Important changes, such as user-driven changes, to a file or to a directory in a volume are detected and recorded. According to one aspect, a computer-readable change journal is kept for a storage volume. The change journal has a plurality of change records each having a unique identification that unambiguously specifies the order in which the records were created, wherein each change record records one or more changes to a file in a computer-readable storage volume. Each change record is created in response to selected types of changes to the file in the storage volume, and each records one or more reasons why the file was changed. In addition, an entry is made for the file in an index of files on the storage volume, with the entry providing a reference to the unique identification for the change record, to allow the most recent change record for a file to be identified from the index.

According to another aspect of the invention, there is provided a data structure comprising a computer-readable change journal stored on a computer-readable carrier. The change journal has a plurality of change records each having a unique identification that unambiguously specifies the order in which the records were created, wherein each change record records one or more changes to a file in a computer-readable storage volume. Further, each change record specifies one or more reasons why the file was changed. Additionally, the data structure includes an entry for the file in an index of files on the storage volume, with the entry referencing the unique identification for the change record.

According to other aspects, the invention is embodied in a file system and in an operating system.

BRIEF DESCRIPTION OF THE DRAWING

FIG. 2 illustrates the structure of one example embodiment of a change journal according to the present invention.

FIG. 3 illustrates the structure of one example embodiment of the records in the change journal according to the present invention.

FIG. 4 illustrates one example embodiment of a master file table for a storage volume according to the present invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Hardware and Operating Environment

Figure 1:
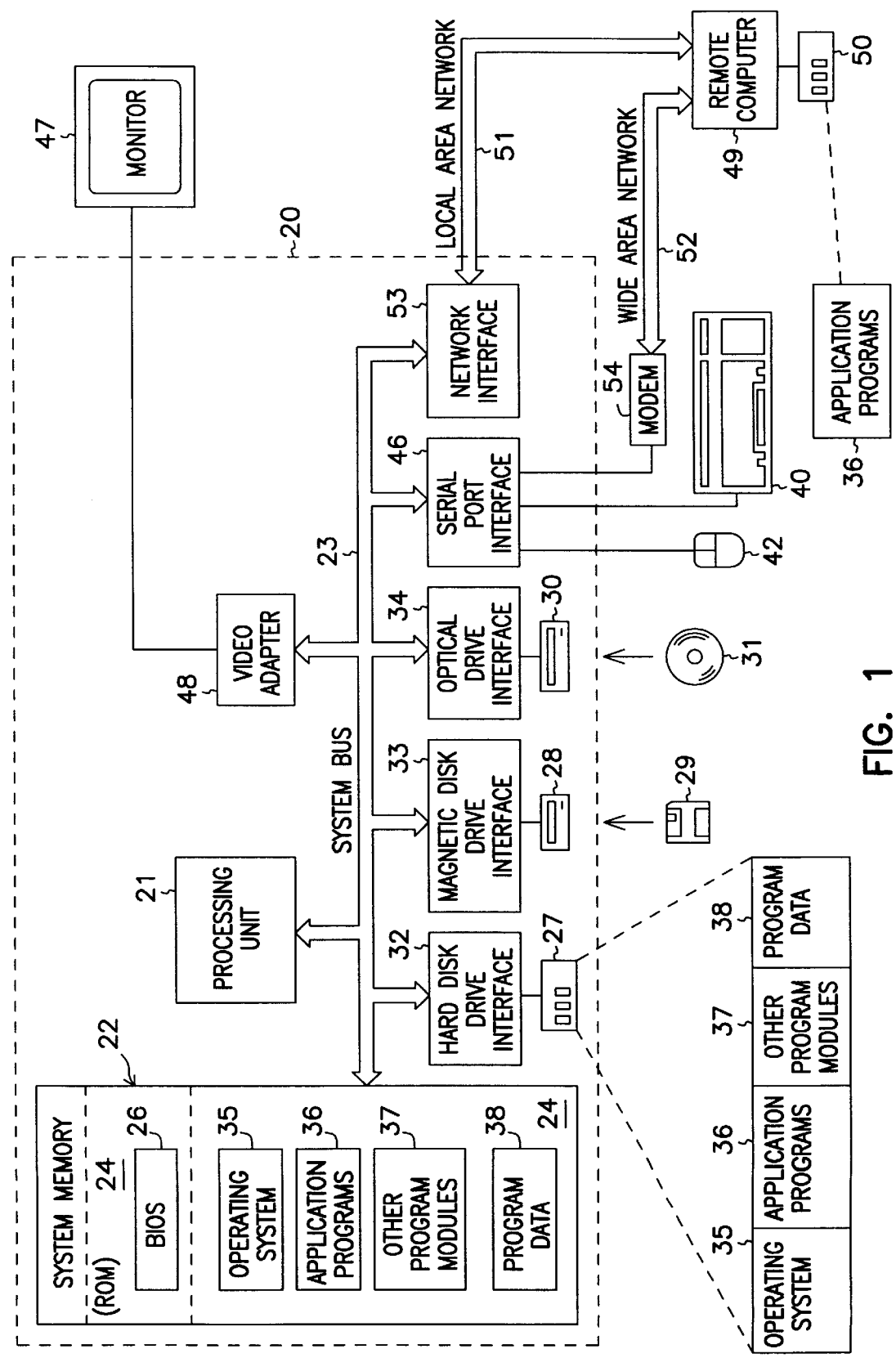
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc. that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, an embedded computer or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

The Change Journal

Figures 2, 3, 4:
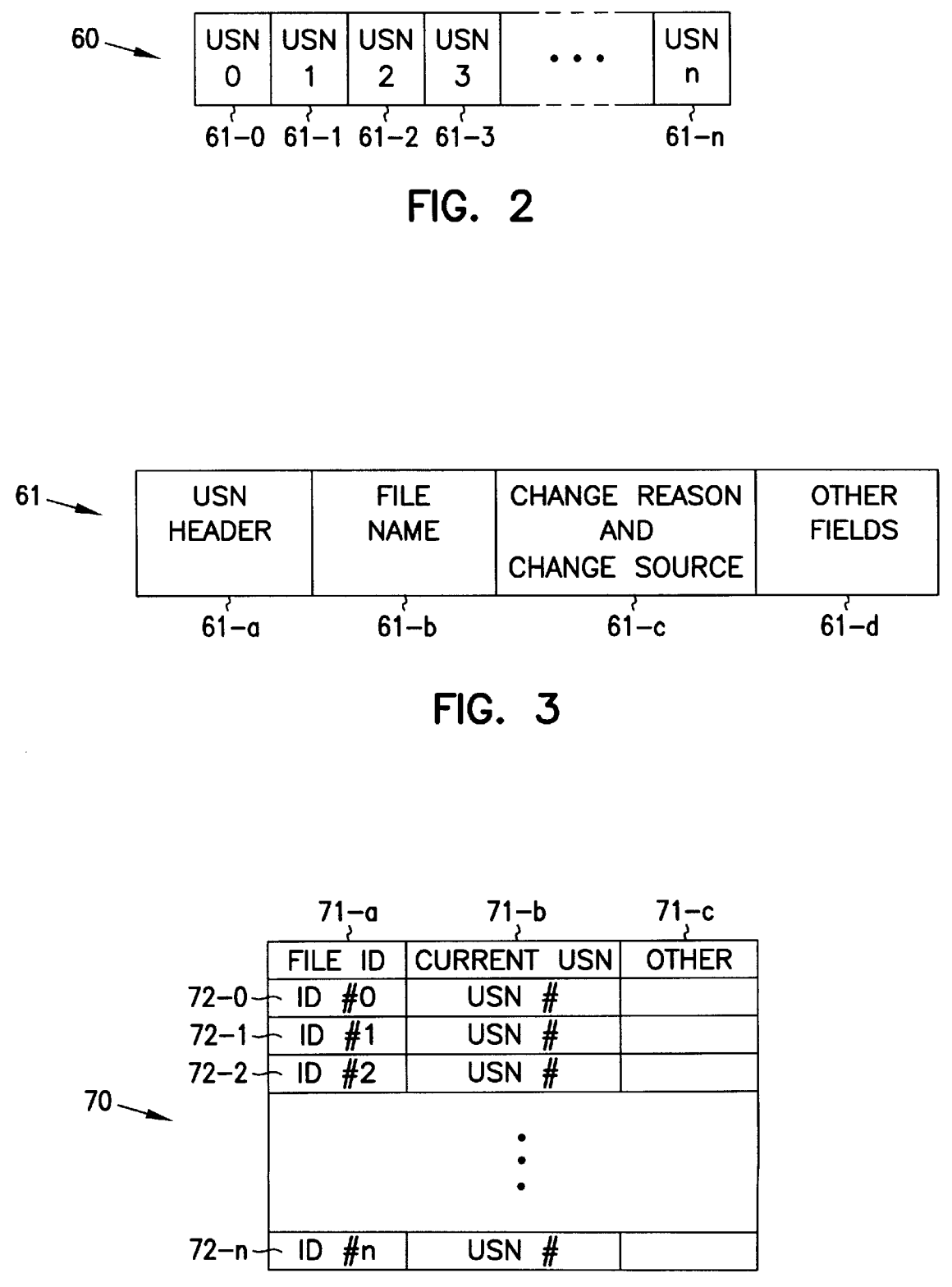

Referring to FIG. 2, there is illustrated in simplified form an example embodiment of a storage volume change journal 60, according to the present invention. Change journal 60 includes a number of change journal records 61, itemized as 61-0 to 61-n. Each change record 61 includes information concerning modifications or changes made to a particular file maintained in a storage volume, such as a write, truncate or delete operation, as itemized in further detail below.

Each of these journal records is identified with a unique update sequence number ("USN"). The USN for a journal record is guaranteed to be unique for all time; that is, USN's are not recycled. For this purpose, the example embodiment of the invention herein described allocates 64 bits for addressing USN's. This provides a unique address for a large number of change records. Assuming that approximately four (4) change records per second are generated in a volume, this addressing capability should suffice to provide a unique USN for more than twenty (20) years of continuous operation, which is far beyond the reasonable life expectancy of any computer system on which the invention may be employed. It should be understood, however, that other ways of providing a unique USN could be used, and that the approach herein described should not be taken as in any way limiting. For instance, USN's may be assigned with a minimum gap in numbering between each USN, for instance a gap of approximately 60 or more. Furthermore, the recycling of USN's is also within the range of alternate embodiments envisioned for the invention.

As further illustrated in FIG. 3, each record 61 includes a plurality of fields, itemized as 61-a to 61-d. Each record 61 has a fixed-length header 61-a having seventeen (17) 4-byte words, and takes the form of a fixed-length file header. The file header includes the 16-bit USN. Each record also includes a variable length field 61-b that specifies the name of the file in the volume corresponding to the change record 61. A further variable length field 61-c specifies the collective change reason history for the file, including a history of the source of a change, as explained in more detail below. Other fields 61-d that may be included could specify the length of the record 61, one or more recorded version numbers specifying the structure of the record, the ordinal of the file being enumerated, the ordinal of the parent of the file, the most recent USN of the file, a UTC time stamp, the security descriptor assigned to the file, file attributes, and the length in bytes of the name of the file. It is noted, however, that this is only one example form of a change record, and that many other record formats would be suitable for the purposes of the invention.

If, for example, the typical change record has a length on the order of 128 bytes, each megabyte of change journal can be expected to record 8192 changes. For a typical use of the Windows® NT® operating system, approximately four (4) changes or less per second in the change volume would be expected. Thus, for this case, one megabyte of change journal should suffice to hold all the changes that occur in thirty (30) minutes of operation. Thus, for this example, 16 megabytes of storage should hold eight hours' worth of changes, giving ample time for traditional storage management services to read about these changes. Thus, each subsequent change record 61 in the change journal 60 is recorded at a time more recent than the previous change record 61, and furthermore, a USN for a record 61 can unambiguously indicate whether the change record 61 comes before or after another change record 61.

As discussed further below, in the example embodiment herein described, the change journal 60 is circular. Thus, generally speaking, portions of the change journal 60 holding the oldest entries are deallocated as new entries are added so that the total storage allocated to the change journal does not exceed a desired size.

It is preferred, but not required, that the change journal 60, according to the example embodiment herein described, be kept in a native file format, which can be manipulated with native file management functions of the file system controlling the storage volume.

The change records 61 and files in the storage volume are cross-referenced to each other. As noted, each change record 61 specifies the name of the file for which it records changes. Similarly, each file record in the master file table ("MFT") 70, as illustrated in simplified form in FIG. 4, includes a reference to a change record 61 corresponding to the file, if one exists. As illustrated, MFT 70 includes a plurality of records 72-0 to 72-n, each representing a file, and each including a field, or column 71-a, specifying the identification or name of a file, a field 71-b specifying the USN for the most recently created change record 61 for the file (as updated by the file system), and other fields 71-c as may normally be maintained for a file in an MFT.

Change Reasons Recorded in the Change Journal

In the present example embodiment, there are provided a number of change reason codes which correlate to operations in the storage volume as follows:

| Operation | Change Reason Code |
| --- | --- |
| Data Overwrite | USN_REASON_DATA_OVERWRITE |
| Data Extend | USN_REASON_DATA_EXTEND |
| Data Truncation | USN_REASON_DATA_TRUNCATION |
| Named Data Overwrite | USN_REASON_NAMED_DATA_OVERWRITE |
| Named Data Extend | USN_REASON_NAMED_DATA_EXTEND |
| Named Data Trancation | USN_REASON_NAMED_DATA_TRUNCATION |
| File Create | USN_REASON_FILE_CREATE |
| File Delete | USN_REASON_FILE_DELETE |
| Property Change | USN_REASON_PROPERTY_CHANGE |
| Security Change | USN_REASON_SECURITY_CHANGE |
| Rename Old Name | USN_REASON_RENAME_OLD_NAME |
| Rename New Name | USN_REASON_RENAME_NEW_NAME |
| Indexable Change | USN_REASON_INDEXABLE_CHANGE |
| Basic Info Change | USN_REASON_BASIC_INFO_CHANGE |
| Hard Link Change | USN_REASON_HARD_LINK_CHANGE |
| Compression Change | USN_REASON_COMPRESSION_CHANGE |
| Encryption Change | USN_REASON_ENCRYPTION_CHANGE |
| Object ID Change | USN_REASON_OBJECT_ID_CHANGE |
| Reparse Point Change | USN_REASON_REPARSE_POINT_CHANGE |
| Stream Change | USN_REASON_STREAM_CHANGE |
| Close | USN_REASON_CLOSE |

This list of reasons can be expanded or reduced if desired. For example, the change record could be extended to include the exact range of the bytes in the data stream that is being modified. The initial amount of information externalized in the change records 61 could also be increased. For example, the name of the named data stream that is being modified could be included in a change record.

In addition to the above change reasons, there is one additional reason, a close reason, used to express that the caller connection to the underlying entity has been closed. This reason code is USN_REASON_CLOSE. It represents the end of a session of changes (explained further below) to the underlying entity in the volume. The record 61 that contains this reason also contains all the reasons that pertain to the set of changes that happened in the session. Thus, an application or system service that needs only to track summaries of changes may do so by inspecting only those records that contain the close reason. As described further below, in the preferred implementation, a caller may request that an explicit close record be written, even when no changes to the file have happened. This action always generates a change record 61.

Sources of Changes Recorded in the Change Journal

The change journal 60 of the present invention also records the source or service initiating each change. Knowing the source of a change, as described below, can be important information. Recording the source (e.g., service) initiating a file operation is both useful, and necessary in some cases. In some cases a file operation may be of no interest, or not representative of an important change in status if performed by one service as opposed to another. For instance, if a file is migrated out of the storage volume temporarily to another storage manager or storage repository to preserve storage space, and returned, the file system 81 would record this as a write, while in fact the file did not change status from the perspective of the user. Thus, in this case, it is advantageous to know the source of the file operation, so that the change journal can be updated to reflect the source of change, and the reader of the journal can choose whether to act on the changes based on the source of the change.

In other cases, it is possible that without knowledge of the source of a change, an undesirable loop may be established. For instance, an application may monitor the change journal in order to detect a change in the status of a file and, in response to such a change, update the file with some auxiliary information, such as the addition of a thumbnail sketch to a graphics file. In this case, it is important for the change record to indicate the source of the auxiliary information updated to the file so that the application does not in turn respond again to the change in file status that would normally be caused by the addition of the auxiliary information to the file, thus creating a potentially endless loop. A second example is when file replication writes a new version of a file, this operation in turn generates change records, and thus a loop is also provoked.

To account for the source of a change to an entity in a volume the change journal 60 currently offers two special identities. One identity is for those data sources that are performing storage management functions, like remote storage migrating a data stream away from the volume. In this category, it is expected that the data management service will not modify the external view of the entity in any manner. The second identity is for those applications that produce additional information based in the existing data but that do not alter the underlying data, like producing a thumb-nail sketch of an image or producing a computed signature for a data stream. In this category it is expected that the computation does not alter the original data and that it produces additional data stored with the underlying entity, be it a file or a directory. In this example embodiment these two sources of changes are expressed in each record, respectively, with the codes:
 USN_SOURCE_DATA_MANAGEMENT and
 USN_SOURCE_AUXILIARY_DATA.

One extension of the reliable change journal service relates to the amount of records retained by the system. To extend the amount of change history available to applications without having to reserve a large amount of storage in the area administered by the journal, an archiving service can be layered so that it retains a large set of records.

Similar to change reasons, only a cumulative or collective history of the sources of changes is recorded in the change journal 60, as described more fully below.

Operation of the Change Journal in a Computer System

Figure 5:
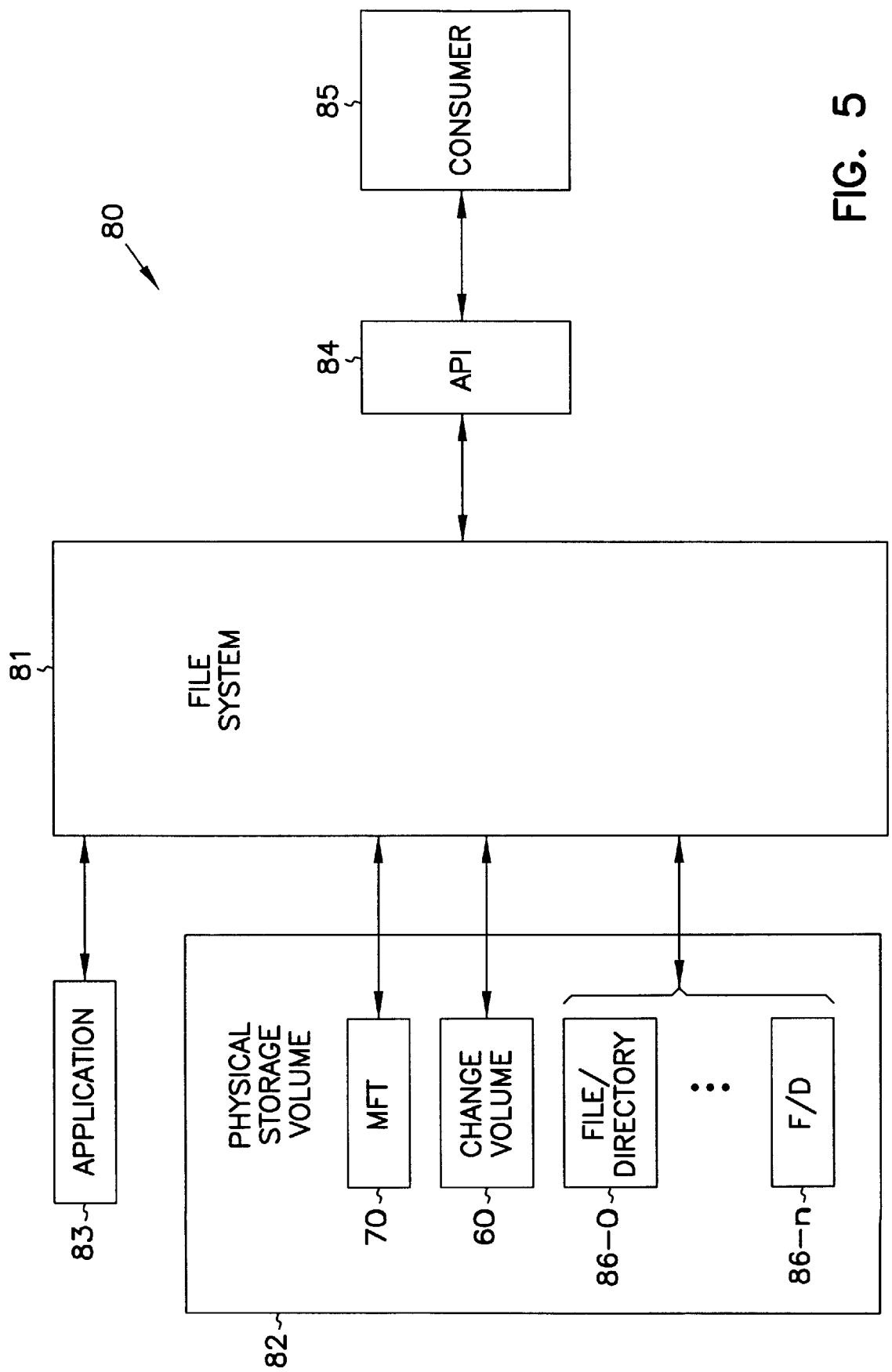
FIG. 5 is a simplified overview of one example embodiment of a file management system according to the present invention.

FIG. 5 illustrates in simplified block diagram form an example embodiment 80 of the invention. In this embodiment, a file system 81 manages a physical storage volume 82, which holds a change journal 60 for the volume, an MFT 70 for the volume, and a plurality of files or directories 86, itemized as files or directories 86-0 to 86-*n*. An application 83 requests file operations from the file system 81, such as creating, deleting, reading and writing files 86. A change journal consumer 85 accesses the change journal through an application-programmer's-interface (API) 84.

File system 81, implemented in software as part of an operating system, includes the conventional file system capabilities, as for example found in the file systems for the commercially available Windows® 95®, Windows® NT®, or UNIX-type operating systems. These capabilities include operations such as creating, deleting, renaming, writing, reading and truncating files 82-0 to 82-*n* in the storage volume 82. Additionally, file system 81 is adapted to maintain and service calls to the change journal 60.

Consumer 85 may be, for example, content indexing, file replication, or incremental backup. The following four change journal operations are available to the consumer 85 through API 84: 1) create journal, 2) delete journal, 3) read journal, and 4) query journal. The create journal operation instructs the file system 81 to establish a change journal 60 for a particular storage volume. The delete journal operation instructs the file system 81 to delete an existing change journal 60. Preferably, file system 81 is designed to delete an existing change journal 60 as a background operation, providing a notification to the consumer 85 upon completion. This allows the consumer 85 requesting the deletion to continue on with its thread without waiting for the deletion to complete. Furthermore, the delete journal operation is preferably persistent, that is, upon failure and rebooting of the operating system, the delete operation will continue if it was interrupted before completion. The read journal operation allows one or more change records 61 of a journal 60 to be read. The query journal operation allows a journal 60 to be queried for the unique identifier for the journal, the range of USN's that can be read from the journal, the lowest USN that was written to the journal, the highest USN that can be written to the journal, its current size, the last USN assigned, and the amount of maximum storage to be used. In the case of each of the above-noted operations, the user obtains a handle for the storage that contains the journal, and is used for the various calls to the API 84. In the case of a query operation the USN for the desired change record 61 is supplied as a parameter.

Figure 6:
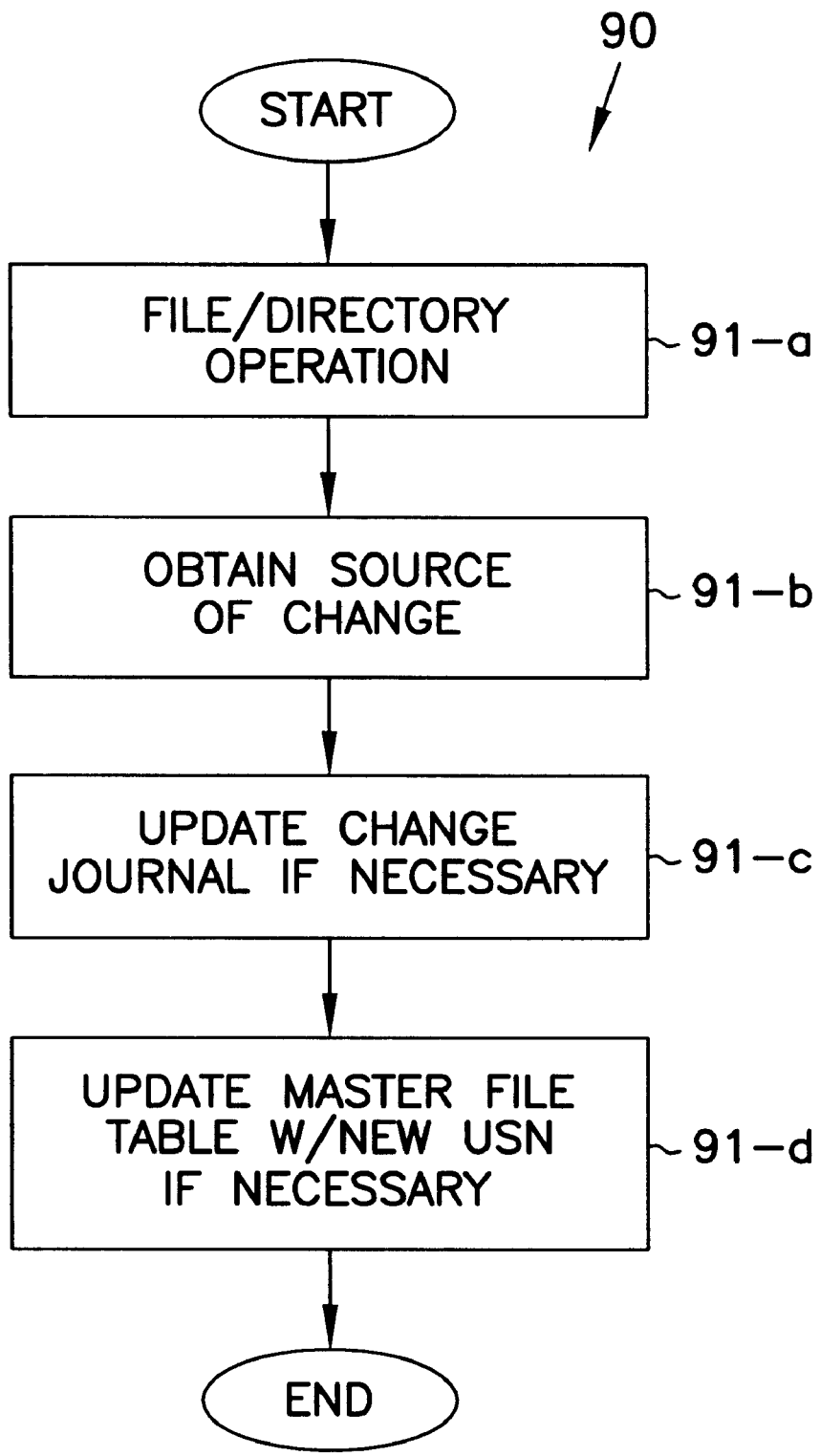
FIG. 6 is a simplified flow chart illustrating the operation of one example embodiment of the change journal system of the present invention.

FIG. 6 illustrates in simplified block diagram form the operation 90 of the file system 81 to maintain the change journal 60. First, at step 91-*a*, the system 81 is requested to perform, or, on its own initiative, desires and does perform, a file operation, such as those operations enumerated above. System 81 also determines, at step 91-*b*, the source of the operation, that is, which element of the computer system is requesting the operation. At step 91-*c*, the file system 81 updates, if necessary, the change journal 60 for the associated volume. If an update is necessary, the file system adds a new change record 61 to the change journal 60, and assigns that record the next unique USN for the volume. Next, at step 91-*d*, the file system 81 updates the MFT 70 with the necessary information concerning the changes made to the file, and adds to the entry 72 for the file 86 the USN assigned to the change record 61 just added to the change journal 60. Thus, the most recently added change record 61 for any given file 86 may be readily identified by reading the corresponding entry 72 in the MFT 70.

Adding New Change Records to the Change Journal

Figure 7:
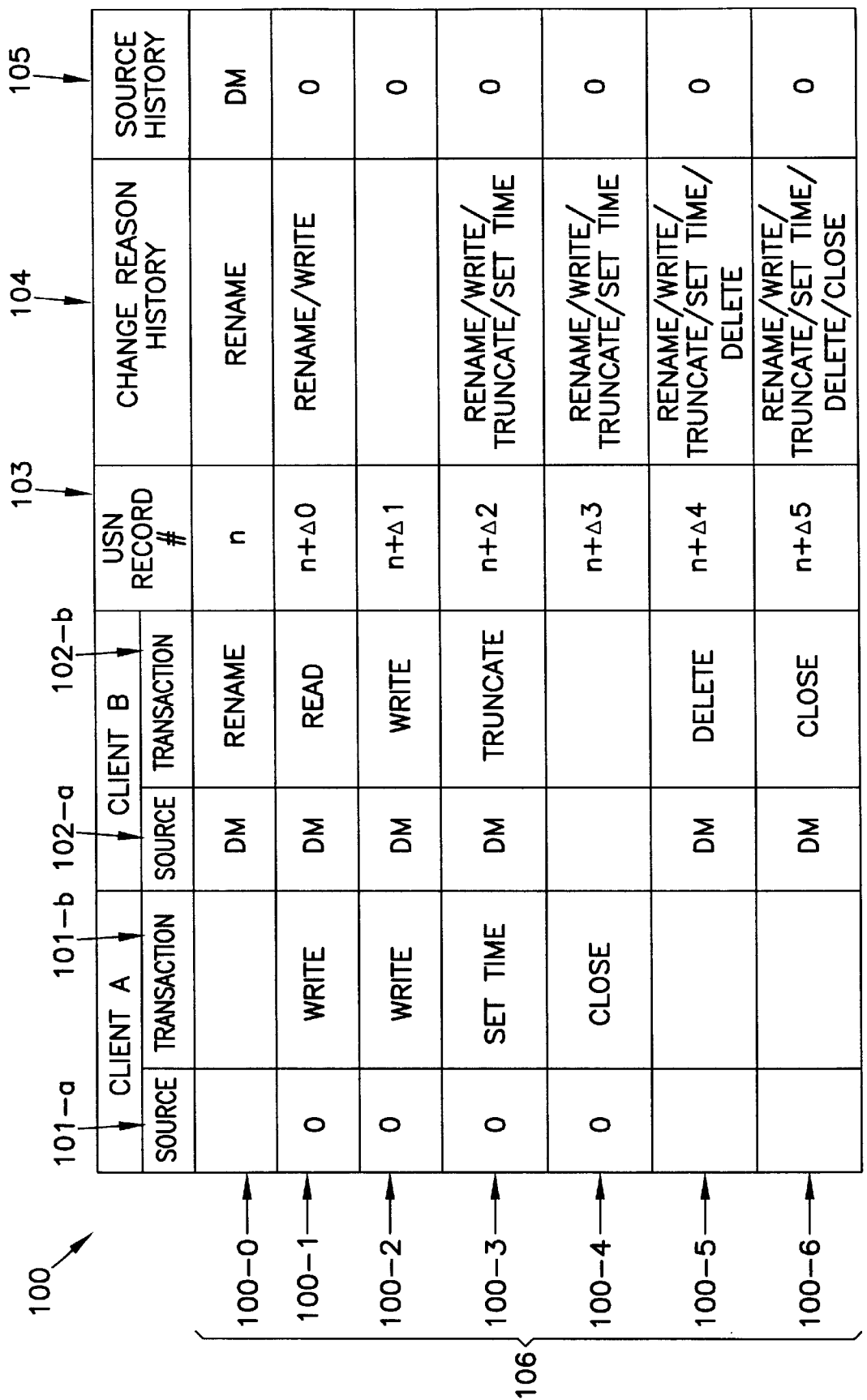
FIG. 7 is a time line illustration of the operation of one example embodiment of the change journal system according to the present invention.

FIG. 7 illustrates the process by which change records 61 are created and added to the change journal 60, for an example series of file operations, by two clients A and B, to the same file. As will be illustrated in more detail, each change record is a collective or cumulative history of all changes made to a file 86 between two selected events or conditions. The file operations between these events are defined as occurring during a "session." For example, in the present example embodiment, a session begins after a file is closed, and ends when the file is closed again; however, other delimiters of a session can be used. An operation occurring more than once in a session is recorded only once in each change record 61 created during the session. Further, only operations that modified the file contents or related information are recorded. Thus, read are not recorded. An update to "last access time" which is the result of the read does not generate a new record, but a specific action by a user to update "last access time" does generate a record. Thus, the change journal in general, and a change record or series of change records in particular, does not record each and every operation performed on a file. Only the first occurrence of an operation will cause a record to be generated, with all subsequent records in the session containing the information from that occurrence. However, in an alternate embodiment, all operations might be recorded. In addition, one could also track which specific ranges of bytes changed.

Referring now to the table 100 of FIG. 7 in more detail, it will be seen that table 100 includes columns 101-*a*, 101-*b*, 102-*a*, 102-*b*, 103, 104 and 105, and rows 100-0 to 100-7. The rows represent a sequence of file operations, with time increasing as the rows descend. For a client A, column 101-*a* represents the source of a file operation and column 101-*b* the type of the operation (such as create, delete, read or write). Columns 102-*a* and 102-*b* represent the same information for a client B. Column 63 specifies the USN for a change record 61 added to the change journal 60 in response to the operation represented in one of columns 101-*b* or 102-*b*. In column 103, $\Delta 5 > \Delta 4 > \Delta 3 > \Delta 2 > \Delta 1 > \Delta 0$, as required by the ever increasing USN associated with successive file operations. As illustrated, each successive change record 61 has an USN, which is greater than the last. Column 104 specifies the change reasons to be entered into the corresponding change record 61. Column 105 specifies the change source to be recorded with the change reason(s). The operations bracketed in the table 100 of FIG. 7 are all within a single session 106, with the first change record n in the session being represented in row 100-0.

As shown in table 100, the first change record n expressed in the change record 61 specifies "rename" as the change reason, and data management ("DM") as the source of the service making the change to the file. In actual operation, the codes for the change reason and source are recorded in a record 61. The rename reason reflects the operation of client B to rename the file, as requested by the DM source. The second change record in the session, record $n+\Delta 0$, specifies "rename/write", reflecting the write operation performed by client A in addition to the rename operation performed by client B. Note that a rename operation generates two USN records, the first one recording the old name and parent, and a second one recording a new name and parent. The read operation initiated by client B is not recorded in the change record. Also, the source 0, representing a normal or ordinary caller (no special source information available), is recorded in change record $n+\Delta 0$. The write operations shown in row 100-2 do not require the addition of a new change record, because they do not involve any change in the status of the previous change record. Neither write operation need be recorded since a write has already been recorded in a previous change record created during the same session. Similarly, the source to be recorded in the change record does not require a change.

As shown in row 100-3, client A initiates a set time operation (noted as USN_REASON_BASIC_INFO_CHANGE), while client B initiates a truncate operation. Both changes are recordable operations so a new reason is recorded, and therefore a new change record $n+\Delta 2$ is created. This change record specifies "rename/write/truncate/set time" as the change reason, and the source remains set to "0." As illustrated in row 100-4, client A initiates a close operation on the file. When a client initiates a close operation it indicates that is has no other operations to perform on the file. The file system is aware of all other clients who may still wish to perform operations on the file. Thus, as there is a second session on the file the close record is not generated. In row 100-5, the delete command initiated by client B results in a new change record $n+\Delta 4$, which specifies the change reasons as "rename/write/truncate/set time/delete", and the source as "0." Finally, the session is brought to close by client B initiating a close operation on the file, such that the file is closed and no longer being accessed by any other entities. This results in the change record $n+\Delta 5$, which specifies the change reasons as "rename/write/truncate/set time/delete/close", and the change source as "0." This is so because changes that needed to be observed in the volume take precedence over the DM-marked changes.

Once the session 106 is completed, a new session is opened for the file. Thus, the next time an operation is performed on the file, the change reason will be determined as though that operation is the first to be performed on the file, as was illustrated above with respect to the operations itemized in row 100-0 of table 100. Thus, at all times, a single change record 61 sets forth a summary of all of the actions on a file that have occurred during a session, that is, since the last time the file was closed to all entities.

As illustrated, the sources of file changes don't accumulate. Rather, they supercede one another, that is, only the last source of a file change is saved in a record. The first client to perform some operation on a file within a session establishes the base source information reasons. Any other clients who are active within a session will cause source information to be removed, never added. Each source information bit in the base source information which is not present in a client who makes changes within a session will be removed from the source information field for each subsequent record within the session. This means that bits are never added during a session, only removed. This is also a case where a new change record will be generated during a session even though there may be no new change reasons. New change records are generated on the first occurrence of a change reason in a session or the first occurrence where a client may cause a source information bit to be removed. For example, consider a Client A who has USN_SOURCE_AUXILIARY_DATA as his source information and a Client B who has 0. If Client A writes to the file first in a session then a change record with reason write and source information of USN_SOURCE_AUXILIARY_DATA will be generated. If Client B then writes to the file a new change record with reason write (no new reason) and source information of 0 (a change in source information) will be generated.

Deallocating Old Change Records

Figure 8:
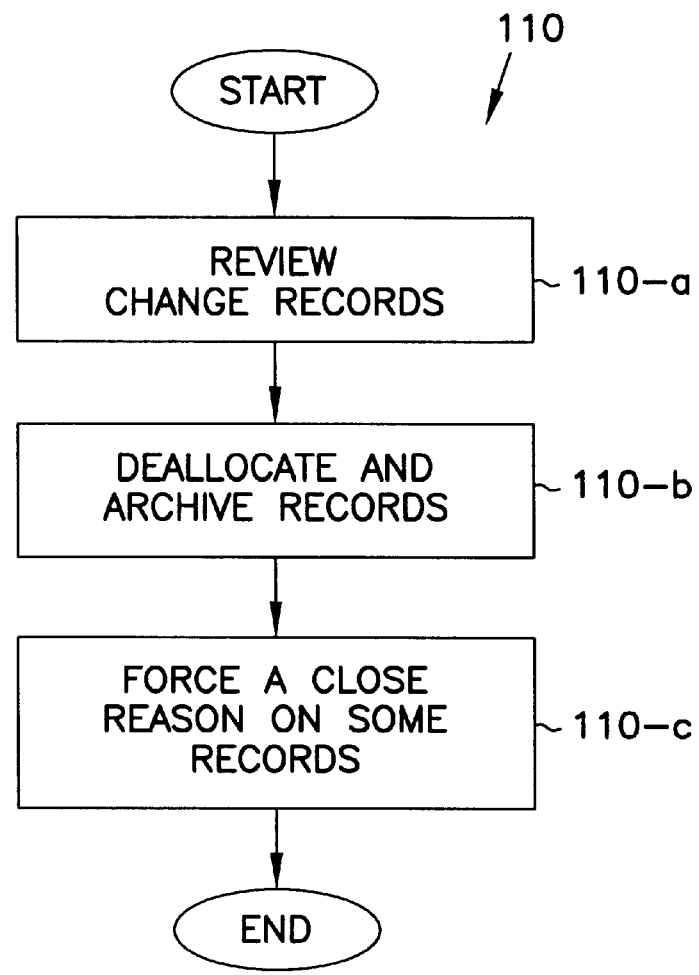
FIGS. 8 and 9 illustrate one example embodiment of the process for deallocating records in the change journal according to the present invention.
Figure 9:
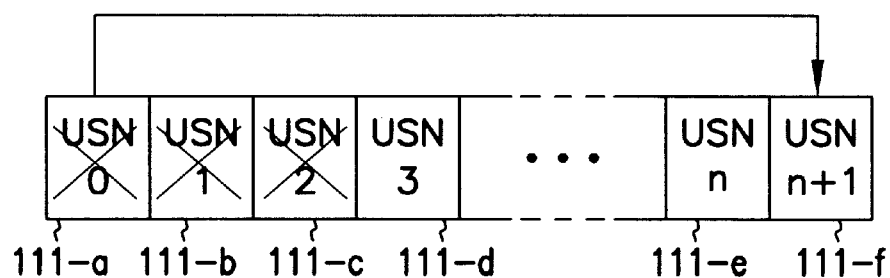

As noted above, in the example embodiment herein described, the change journal 60 is a circular file. This requires that portions of the file holding the oldest change records be deallocated, or returned for re-use by the file system, from time to time, or on a continuous basis. FIGS. 8 and 9 illustrate this process. When the change journal reaches or approaches its size limit, which may be set statically or dynamically (for instance, based on available storage volume), the file system 81 reviews the change records, represented by step 110-a, working from the oldest record forward, as determined by finding the record with the lowest USN. For any given file, any change records which precede a change record representing a complete session may be deallocated. However, only the oldest such change records necessary to reduce the size of the change journal to its desired size are deallocated, as shown in step 110-b. Deallocated change records are marked until a contiguous block is assembled, and then truncated from the change journal, returning the storage space to the file system for re-use. Prior to truncation or deallocation, these change records are preferably archived by simply appending them to an archive change journal (step 110b) which, preferably, holds all previously deallocated change records. Thus, according to the present example embodiment, the archived change journal and the active change journal together contain all of the change records for the associate storage volume, providing a change history for each file created or modified since the change journal was created. This archival service would have the flexibility to store these records in any volume of its choice and to store any amount of them.

In the illustration of FIG. 9, change records 111-b and 111-c have been deallocated per the process outlined above. However, in this example, change record 111-a cannot be deallocated since the handle for the file has been left open as of the time corresponding to change record n, such that there are no succeeding change records which represent an entire session. However, in order to truncate the area of the change journal associated with records 111-b and 111-c, it is necessary to also truncate the area of record 111-a. As a result, there is a need to remove record 111-c from the change journal 60. To do so, the file system 81 creates a new change record 111-f (USN=n+1) for the file, and enters a false "close" reason to the change reasons for the record. Thus, while the file may actually still be open, the change journal 60 regards it as closed for the purpose of allowing the deallocation of the earlier change records for the file. This record can be thought of as a summary "to date" of the changes that have already occurred.

The close record reason is an optimization to allow consumers of the change journal to be notified when there is likely to be no immediate new activity in the file. However, it doesn't mean there won't be immediate activity. Any forced close record may wake a consumer at a time when it is more likely that there will be activity in the file but there is never any guarantee that the file is inactive. What is guaranteed is that an entity, which watches for close records, will be able to know of all of the change reasons for a file.

A number of API calls are provided for API 84, as follows:

Enumerate Master File Table and Filter by USN

This call enumerates files in a volume, beginning at a specified position in the set of files. Files returned by this call can be filtered by the USN of the last change to the files.

Create USN Journal

This call provides for the creation of an USN journal. The maximum size and an allocation delta, to be added to the end and removed from the beginning of the file, are specified by the call.

Read USN Records

This call allows USN records to be read. The starting USN for the read is specified. A reason mask allows the call to specify only those records that include change reasons of a particular type. A return on close flag can be specified, and is nonzero if the caller does not want to be notified when the change actually occurs, but rather when the final handle has been closed on the file. (In this case the caller must specify USN_REASON_FLAG_CLOSE.) The USN journal support guarantees that all of the above changes will eventually generate a call on close. In the event that a given file is not closed prior to a volume failure, system failure or shutdown, the close call will be appended to the journal the next time the volume is mounted, even if there is an intervening reboot of the system. If the flag is specified as 0, then the caller will receive notifications the first time each desired change is logged, as well as at close. The close record in any case will show the accumulation of USN reasons for all changes that occurred to the file. Each time the final close occurs on the file, a CLOSE record is written to the journal, and the USN reason flags for the file are all reset.

For a file in which no user sections are created, the final close occurs when a close file is issued on the last user handle to the file. If a user section is created on a file, however, the final close does not occur until all user file and section handles are closed for the file, and memory management dereferences its file object when the last page of the file leaves memory.

Timeout and Bytes-To-Wait-For parameters can also be specified in the call. If Bytes-To-Wait-For is nonzero, then if the Read USN Journal call hits the end of the journal file without finding any data to return, then a wait will occur until Bytes-To-Wait-For bytes of (unfiltered) data have been added to the USN journal. If the Timeout parameter (for example as used in Windows NT®) is nonzero, then if the wait is not satisfied within the specified time, then processing will resume as the result of a timeout. In either case, after the wait, any new data which has been appended to the USN journal will be processed at that time. If there are still no bytes to return, the wait will be repeated. In this mode, the Read USN Journal call will remain outstanding until at least one USN record may be returned, or the I/O is canceled.

If Bytes-To-Wait-For is specified as zero, then the call will always return with success when the end of the journal file is encountered, with the USN that should be used for the next Read. The caller should not immediately call back in the case that the return USN is the same as the Starting USN that was supplied.

Read File USN Data

This call returns the USN record for the file opened by the specified handle.

Write USN Close Record

This call provides for simulating a close on the current handle, and returns the USN for the generated close record.

Notification of Change Record Availability

In one example embodiment of the invention callers of the service can be notified that change records are available in several manners. For example, they can provide the reliable change journal service with a buffer and a timeout to be used when providing a set of change records. The call to the service will return either when the timeout has expired or when the buffer has no more space available for complete journal records.

In the example embodiment herein cited, the reliable change journal may be rendered inactive. All changes that happen to the volume while it is inactive will not be recorded by the journal. When this system service is activated again, users of the service have means of identifying that there has been a gap in service. This is done through a journal identity and through USN values that are used to identify each individual journal record.

Interruptions in the Continuity Integrity of the Change Journal

It is possible that the continuity or integrity of the change journal may be lost from time to time; that is, that the change journal cannot be trusted to represent the true change history of the files in a storage volume. For example, as noted above, the reliable change journal can be rendered inactive after it has been in operation for some time. This situation may also occur, for example, if the storage volume is temporarily removed from control of the file system 81, and the files stored thereon modified by another file system. In this case, it is necessary for the file system to record and designate the oldest change record 61 that can be trusted. Using this mechanism, change journal consumers 85 can avoid untrusted information in the change journal 60.

Some Specific Forms of the Invention

In one example form, the file system 81 is implemented in software and installed as part of operating system 35 (FIG. 1). The change journal of the present invention is also part of a file system 81, as noted above, which is a component of the operating system 35. Such an operating system may be distributed in machine-readable form such as a floppy disk 29 or CD-ROM 31. The change journal 60 also takes the form of a change journal data structure and/or an MFT data structure recorded on the hard disk drive 27.

Moreover, although the embodiments disclosed herein are implemented in software, the inventions herein set forth are in no way limited exclusively to implementation in software, and expressly contemplate implementation in firmware and silicon-based or other forms of hard-wired logic, or combinations of hard-wired logic, firmware and software, or any suitable substitutes therefor.

Advantages of the Chance Journal

The essential advantages of the change journal are that, first, for any given volume there is a single data stream that describes all the changes that are happening in the volume. Thus, an application or a system service that desires to track changes to a set of entities only needs to do I/O (input/output) to read this one data stream to obtain all the needed information. Second, independent of the number of entities in the volume, only the changes get reflected in this data stream. Thus, if only a few changes happen in an interval of time, the reliable change journal will only have added a few new entries. The reliable change journal allows applications and systems services to track changes reading a number of records proportional to the changes that happen, and not to the number of entities whose changes are being tracked.

In the event that an installation has more than one volume, an application or system service wishing to track changes in all of the volumes is required to read entries from all the corresponding journals. The size of each journal is a configuration parameter that can be changed to fit the needs of the callers of the service. Moreover, all of the above-described functionality is supported.

Conclusion

Thus, the present invention provides a system for keeping a time-ordered change journal of all the changes that happen in a storage volume. Only changes to entities in the volume create entries in the journal. Operations that are not intended to produce changes, like enumerating a directory or reading the data present in a file, produce no entries in the change journal. Furthermore, no change to a file or to a directory in a volume goes undetected. A summary of changes for a file in a given open/close session may be readily obtained from the change journal from a single record.

What is claimed is:

1. A method for journaling changes, comprising:
 a) keeping a computer-readable change journal having a plurality of change records each having a unique identification that unambiguously specifies the order in which the records were created, wherein each change record records one or more changes to a file in a computer-readable storage volume;
 b) creating each change record in response to changes to the file in the storage volume, wherein changes to the file occur during sessions, and wherein when an operation occurs more than once in a session, only a first occurrence of the operation is recorded in each change record; and
 c) recording in each change record data representing one or more reasons why the file was changed.

2. A method according to claim 1 further including updating an entry for the file in an index of files on the storage volume to reference the unique identification for the change record created when the file was last changed.

3. A method according to claim 1 further wherein the change journal is circular, wherein older records are eliminated from the journal to make room for newer records.

4. A method according to claim 1 further including the step of recording in a change record an indication if a session has been completed.

5. A method according to claim 1 further wherein one or more successive change records created for a file during a session record the collective history of changes to the file occurring during a session.

6. A method according to claim 4 further including the step of eliminating from the change journal all records for a file which precede a record which includes a set of change reasons representing all relevant changes occurring in a file during a session.

7. A method according to claim 1 further including the step of storing the change journal on the same storage volume as the files.

8. A method according to claim 1 further including the step of archiving change records eliminated from the change journal.

9. A method according to claim 1 further including the step of reading the change journal to determine changes in a file.

10. A method according to claim 9 further including the step of reading the archived change records to determine changes in a file.

11. A method according to claim 1 further including recording in the change journal the source of a change to a file.

12. A data structure for facilitating journaling of changes, comprising a computer-readable change journal stored on a computer-readable media, the change journal having a plurality of change records each having a unique identification that unambiguously specifies the order in which the records were created, wherein each change record records one or more changes to a file in a computer-readable storage volume, wherein changes to the file occur during sessions, and wherein when an operation occurs more than once in a session, only a first occurrence of the operation is recorded in each change record, and wherein each change record specifies one or more reasons why the file was last changed.

13. A data structure according to claim 12 further including an entry for the file in an index of files on the storage volume to reference the unique identification for the change record.

14. A data structure according to claim 12 further wherein each change record also specifies one or more sources of a change.

15. An operating system program product for journaling changes, comprising:
operating system computer program components recorded on a machine-readable media, the operating system computer program components executable on a computer to act as an operating system for the computer; the operating system computer program components including one or more file system computer program components, the file system computer program components executable on the computer to create a computer-readable change journal having a plurality of change records each having a unique identification that unambiguously specifies the order in which the records were created, wherein each change record records one or more changes to a file in a computer-readable storage volume;
create each change record in response to changes to the file in the storage wherein changes to the file occur during sessions, and wherein when an operation occurs more than once in a session, only a first occurrence of the operation is recorded in each change record; and
a) record in each change record data representative of one or more reasons why the file was changed.

16. An operating system according to claim 15 further including computer program components executable on the computer to update an entry for the file in an index of files on the storage volume to reference the unique identification for the change record created when the file was changed.

17. An operating system according to claim 15 further wherein the one or more computer program components is executable on the computer to record in each change record one or more sources of changes to a file.

18. An operating system program product for journaling changes, comprising:
operating system computer program components recorded on a machine-readable media, the operating system computer program components executable on a computer to act as an operating system for the computer;
the operating system computer program components including one or more file system computer program components, the file system computer program components executable on the computer to create a computer-readable change journal stored on a computer-readable carrier, the change journal having a plurality of change records each having a unique identification that unambiguously specifies the order in which the records were created, wherein each change record records one or more changes to a file in a computer-readable storage volume, wherein changes to the file occur during sessions, and wherein when an operation occurs more than once in a session, only a first occurrence of the operation is recorded in each change record, and wherein each change record specifies one or more reasons why the file was changed.

19. An operating system program product according to claim 18 further including computer program components executable on the computer to create an entry for the file in an index of files on the storage volume to reference the unique identification for the change record.

20. An operating system according to claim 18 further wherein the one or more computer program components is executable on the computer to record in each change record one or more sources of changes to a file.

21. A program product for journaling changes, comprising a computer program encoded on a computer-readable media and executable on a computer to:
a) keep a computer-readable change journal having a plurality of change records each having a unique identification that unambiguously specifies the order in which the records were created, wherein each change record records one or more changes to a file in a computer-readable storage volume;
b) create each change record in response to changes to the file in the storage volume, wherein changes to the file occur during sessions, and wherein when an operation occurs more than once in a session, only a first occurrence of the operation is recorded in each change record; and
c) record in each change record one or more reasons why the file was changed.

22. A program product comprising a computer program product according to claim 21 further wherein the change journal is circular, wherein older records are eliminated from the journal to make room for newer records.

23. A computer program product according to claim 21 further wherein the program is executable on a computer to perform the step of recording in a change record an indication if a session has been completed.

24. A computer program product according to claim 21 further wherein one or more successive change records created for a file during a session record the collective history of changes to the file occurring during a session.

25. A computer program product according to claim 24 further wherein the program is executable on a computer to perform the step of eliminating from the change journal all records for a file which precede a record which includes a set of change reasons representing all relevant changes occurring in a file during a session.

26. A computer program product according to claim 21 further wherein the program is executable on a computer to perform the step of storing the change journal on the same storage volume as the files.

27. A computer program product according to claim 21 further wherein the program is executable on a computer to perform the step of archiving change records eliminated from the change journal.

28. A computer program product according to claim 21 further wherein the program is executable on a computer to perform the step of reading the change journal to determine changes in a file.

29. A computer program product according to claim 27 further wherein the program is executable on a computer to perform the step of reading the archived change records to determine changes in a file.

30. A computer program product according to claim 21 further wherein the computer program is executable on the computer to record the source of change to a file in a change record.

31. A system for journaling changes, comprising:
   a) a storage medium having a computer-readable change journal having a plurality of change records each having a unique identification that unambiguously specifies the order in which the records were created, wherein each change record records one or more changes to a file in a computer-readable storage volume;
   b) an electronic component producing each change record in response to changes to the file in the storage volume, wherein changes to the file occur during sessions, and wherein when an operation occurs more than once in a session, only a first occurrence of the operation is recorded in each change record; and
   c) the electronic component further recording in each change record data representing one or more reasons why the file was changed.

32. A system according to claim 31 further including an electronic component updating an entry for the file in an index of files on the storage volume to reference the unique identification for the change record created when the file was last changed.

33. A system according to claim 32 further wherein the change journal is circular, wherein older records are eliminated from the journal to make room for newer records.

34. A system according to claim 31 further wherein the electronic component records in a change record an indication if a session has been completed.

35. A system according to claim 31 further wherein one or more successive change records created for a file during a session record the collective history of changes to the file occurring during a session.

36. A system according to claim 34 further wherein the electronic component eliminates from the change journal all records for a file which precede a record which includes a set of change reasons representing all relevant changes occurring in a file during a session.

37. A system according to claim 31 further wherein the electronic component stores the change journal on the same storage volume as the files.

38. A system according to claim 31 further wherein the electronic component archives change records eliminated from the change journal.

39. A system according to claim 31 further wherein the electronic component reads the change journal to determine changes in a file.

40. A system according to claim 39 further wherein the electronic component reads the archived change records to determine changes in a file.

41. A system according to claim 31 further wherein the electronic component records in the change journal the source of a change to a file.

42. system according to claim 31 wherein the electronic component is software executing on a computer.

43. A system according to claim 31 wherein the electronic component is hardware.

44. A method for journaling changes, comprising:
   a) keeping a computer-readable change journal having a plurality of change records each having a unique identification that unambiguously specifies the order in which the records were created, wherein each change record records one or more changes to a file in a computer-readable storage volume;
   b) creating each change record in response to changes to the file in the storage volume, wherein changes to the file occur during a session, and wherein one of the change records contains a summary of all changes to the file that occurred during the session; and
   c) recording in each change record data representing one or more reasons why the file was changed.

45. The method of claim 44, wherein the one change record containing the summary of all changes further comprises a close reason representing an end of the session.

46. The method of claim 45, wherein the one change record containing the summary of all changes further comprises a false close reason representing that although the file is still open, earlier change records for the file are deallocated.

47. The method of claim 44, further comprising: updating an entry for the file in an index of files on the storage volume to reference the unique identification for the change record created when the file was last changed.

48. The method of claim 44, further comprising: reading the change journal to determine changes in a file.

49. The method of claim 44, further comprising: recording in the change journal the source of a change to the file.

50. A data structure for facilitating journaling of changes, comprising:
   a computer-readable change journal stored on a computer-readable media, the change journal having a plurality of change records each having a unique identification that unambiguously specifies the order in which the records were created,
   wherein each change record records one or more changes to a file in a computer-readable storage volume,
   wherein changes to the file occur during a session, and wherein one of the change records contains a summary of all changes to the file that occurred during the session, and
   wherein each change record specifies one or more reasons why the file was last changed.

51. The data structure of claim 50, wherein the one change record containing the summary of all changes further comprises a close reason representing an end of the session.

52. The data structure of claim 50, wherein the one change record containing the summary of all changes further comprises a false close reason representing that although the file is still open, earlier change records for the file are deallocated.

53. The data structure of claim 50, further comprising: an entry for the file in an index of files on the storage volume to reference the unique identification for the change record.

54. The data structure of claim 50, wherein each change record also specifies one or more sources of a change.

55. A program product for journaling changes, comprising a computer program encoded on a computer-readable media and executable on a computer to:
   keep a computer-readable change journal having a plurality of change records each having a unique identification that unambiguously specifies the order in which the records were created, wherein each change record records one or more changes to a file in a computer-readable storage volume;
   create each change record in response to changes to the file in the storage volume, wherein changes to the file occur during a session, and wherein one of the change records contains a summary of all changes to the file that occurred during the session; and
   record in each change record one or more reasons why the file was changed.

56. The program product of claim 55, wherein the one change record containing the summary of all changes further comprises a close reason representing an end of the session.

57. The program product of claim 55, wherein the one change record containing the summary of all changes further comprises a false close reason representing that although the file is still open, earlier change records for the file are deallocated.

* * * * *